(12) United States Patent
Yen

(10) Patent No.: US 6,674,302 B2
(45) Date of Patent: Jan. 6, 2004

(54) SELF-COMPENSATION CIRCUIT FOR TERMINAL RESISTORS

(75) Inventor: Chin-Hsien Yen, Hsin Tien (TW)

(73) Assignee: Via Technologies, Inc., Taipei Hsien (TW)

(*) Notice: Subject to any disclaimer, the term of this patent is extended or adjusted under 35 U.S.C. 154(b) by 0 days.

(21) Appl. No.: 10/195,486

(22) Filed: Jul. 16, 2002

(65) Prior Publication Data

US 2003/0094990 A1 May 22, 2003

(30) Foreign Application Priority Data

Nov. 16, 2001 (TW) ........................................ 90128524 A

(51) Int. Cl.[7] .............................................. H03K 19/23
(52) U.S. Cl. .............................. 326/30; 326/27; 326/83
(58) Field of Search .............................. 326/26, 27, 30, 326/82, 83, 86, 89, 90

(56) References Cited

U.S. PATENT DOCUMENTS 5,254,883 A * 10/1993 Horowitz et al. ............. 326/30
5,680,060 A * 10/1997 Banniza et al. ............... 326/30
6,288,564 B1 * 9/2001 Hedberg ....................... 326/30
6,541,996 B1 * 4/2003 Rosefield et al. ............. 326/30

* cited by examiner

Primary Examiner—Don Le
(74) Attorney, Agent, or Firm—Rosenberg, Klein & Lee

(57) ABSTRACT

A self-compensation circuit for terminal resistors includes a current mirror, a reference resistor, a comparator and a plurality of terminal resistors. The current mirror provides a first current through the reference resistor to form a first voltage and a second current through an external resistor to form a second voltage. The comparator compares the first voltage and the second voltage and generates an output voltage that is able to be feedback to the control terminal of the reference resistor. The control terminal of each terminal resistor is connected to the output end of the comparator, thus the resistance of each terminal resistor is able to be proportional to the resistance of the external resistor.

26 Claims, 4 Drawing Sheets

SELF-COMPENSATION CIRCUIT FOR TERMINAL RESISTORS

FIELD OF THE INVENTION

The present invention relates to a self-compensation circuit built in a chip for terminal resistors, especially to a self-compensation circuit built in a chip for terminal resistors referencing to an external resistor.

BACKGROUND OF THE INVENTION

The terminal resistors used for input/output ends can be generally classified into built-in and external terminal resistors. The external terminal resistors can be implemented by connecting discrete resistors externally. FIG. 1 shows conventional external terminal resistors. A terminal resistor 2a with a voltage level pull-down function is coupled between an output end of a chip 1a and a transmission line 3a. The terminal resistors are essential for chips connected to high-speed buses. As the increase of the chip and the chip pin counts on the motherboard, it becomes more and more complicated for completing the layouts of terminal resistors 2a and the wiring of other devices under the restriction of area of the motherboard. Moreover, the total manufacturing costs for the motherboard will be more and more huge if additional discrete resistors are required on the motherboard. To solve the above-mentioned problem, terminal resistors composed of transistors and polysilicon resistors set inside the chip and coupled to input/output ends thereof are proposed. FIG. 2 shows another conventional terminal resistors built in a chip. A terminal resistor 2a is a NMOS transistor within a chip 1a and with the voltage level pull-down function. The NMOS transistor has its source connected to the ground, its drain connected to the input/output end of the chip 1a and a transmission line 3a, and its gate connected to a gate voltage VG. When the NMOS transistor is turned on by the gate voltage VG, the NMOS transistor is functioned equivalent to a resistor and can be adopted as the terminal resistor 2a. However, the characteristic curve of the NMOS transistor for representing the equivalent resistance is non-linear. Therefore, the equivalent resistance of the NMOS transistor is changed when the voltage on the transmission line 3a is changed, thus causing signals on the transmission line 3a to be more unstable than those of using discrete resistors.

FIG. 3 shows another conventional terminal resistor built in a chip. A terminal resistor 2a manufactured by the polysilicon resistor manufacturing technology is within a chip 1a and with a voltage level pull-down function. However, the resistance of the polysilicon terminal resistor 2a is sensitive to manufacturing variables. As this result, the resistances of the polysilicon terminal resistors 2a of different batches may vary in a range of 15%. Consequently, the resistances of terminal resistors 2a in different chips will not be kept to be approximately equal.

SUMMARY OF THE INVENTION

It is an object of the present invention to provide a self-compensation circuit built in chips for terminal resistors, therefore the resistance of the terminal resistor is with the better linear characteristic and able to be compensated by itself to reduce resistance differences.

It is another object of the present invention to provide a self-compensation circuit for terminal resistors within a chip, therefore the number of external resistors required is reduced to lower down total manufacturing costs and the difficulty of wiring other elements on the motherboard.

To achieve above object, the present invention provides a self-compensation circuit for terminal resistors, wherein the compensation circuit including a current mirror, a reference resistor, a comparator and a plurality of terminal resistors is for compensating internal terminal resistors with respect to external resistors. The current mirror provides a first current through the reference resistor to form a first voltage and a second current through an external resistor to provide a second voltage. The comparator compares the first voltage and the second voltage and generates a feedback voltage according to the difference of the first and second voltage. The feedback voltage will be used to control the resistance value of the reference resistor for equalizing the first and the second voltage. The feedback voltage is also used to control the resistance value of the terminal resistor to be equal or proportional to that of the external resistor.

The various objects and advantages of the present invention will be more readily understood from the following detailed description when read in conjunction with the appended drawing.

DETAILED DESCRIPTION OF THE INVENTION

Figure 1:
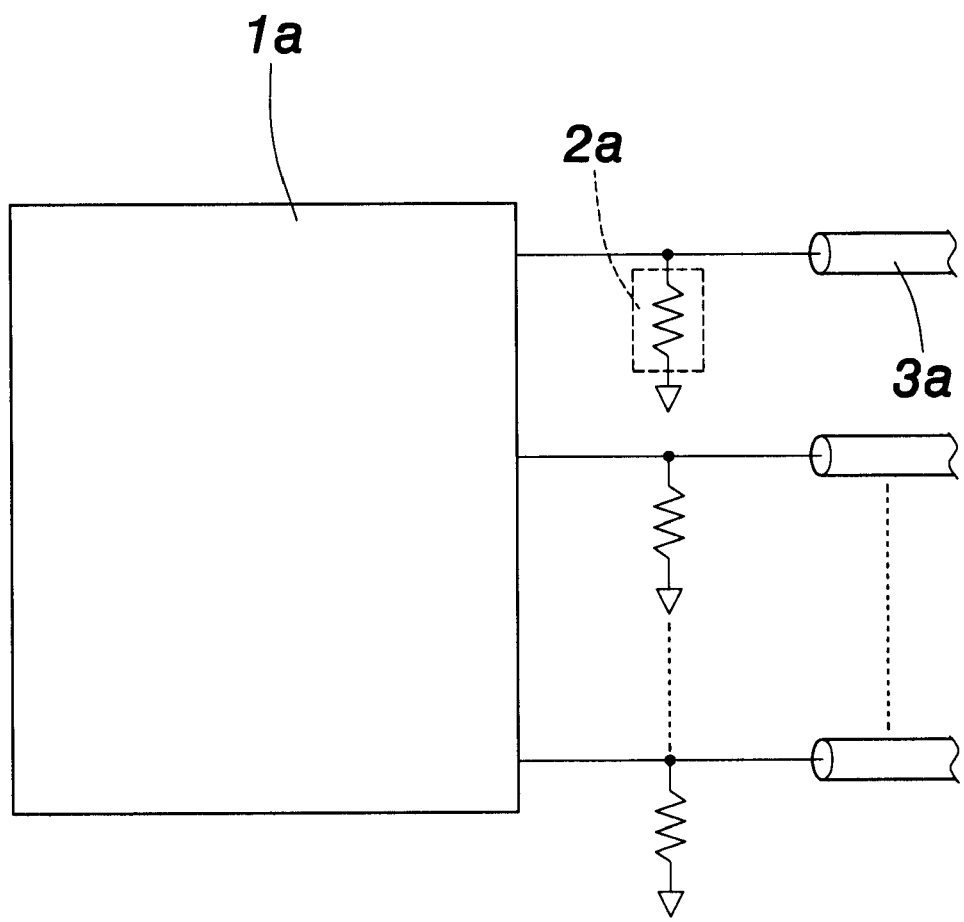
FIG. 1 shows a conventional external terminal resistor.
Figure 2:
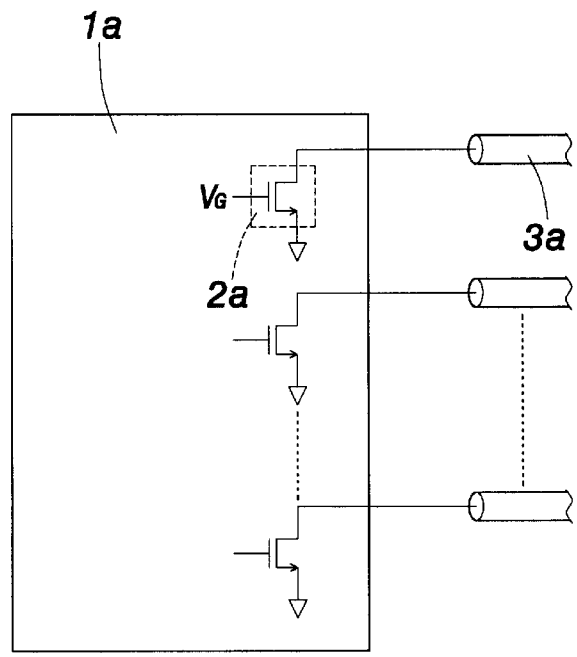
FIG. 2 shows another conventional built-in terminal resistor composed of NMOS transistors.
Figure 3:
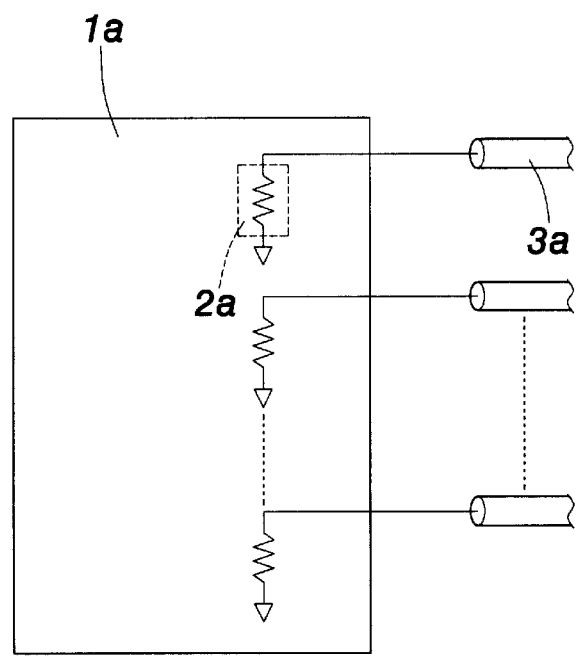
FIG. 3 shows another conventional built-in termination resistor composed of polysilicon resistors.
Figure 4:
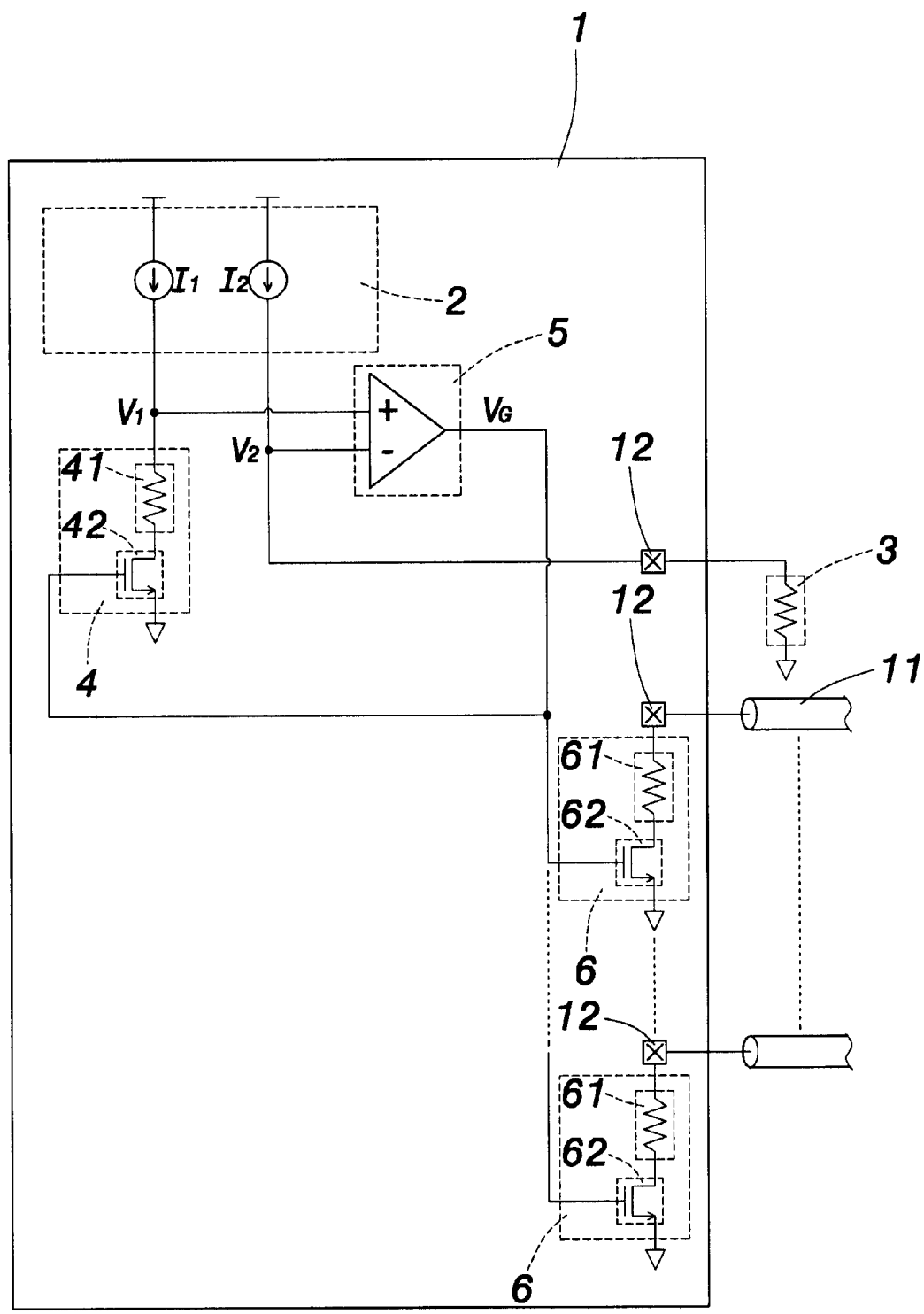
FIG. 4 shows the circuit diagram of the first embodiment of the present invention.

FIG. 4 shows the circuit diagram of a first embodiment according to the present invention. The self-compensation circuit for terminal resistors provides a voltage level pull-down function. The self-compensation circuit according to the present invention is a self-compensation circuit within a chip for compensating terminal resistors according to an external resistor 3. The self-compensation circuit according to the present invention includes a current mirror 2, a reference resistor 4, a comparator 5 and a plurality of terminal resistors 6.

The reference resistor 4 is composed of a polysilicon resistor 41 and a transistor 42 connected in series with the polysilicon resistor 41. In the first preferred embodiment of the present invention, the transistor 42 is an NMOS transistor and one end of the polysilicon resistor 41 is connected to the drain of the NMOS transistor 42. Therefore, the other end of the polysilicon resistor 41 is a first terminal of the reference resistor 4 and the source of the NMOS transistor 42 is a second terminal of the reference resistor 4. Moreover, the reference resistor 4 has a control terminal connected to the gate of the NMOS transistor 42. Each of the terminal resistors 6 is also composed of a polysilicon resistor 61 and an NMOS transistor 62 connected in series with the polysilicon resistor 61. The terminal resistor 6 has a first terminal connected to a transmission line 11 through an input/output end 12 of the chip 1 and a second terminal connected to the ground.

In this preferred embodiment of the present invention, the current mirror 2 is composed of a first current source for providing current I1 and a second current source for providing current I2. The first terminal of the reference resistor 4 is connected to the first current source and the second terminal of the reference resistor 4 is connected to the ground. The comparator 5 has a positive input end connected to the first current source and a negative input end connected to the second current source. The output end of the comparator 5 is connected to the control terminal of the reference resistor 4. The first terminals of all terminal resistors 6 are connected to the transmission line 11 through the input/output ends 12 of the chip 1 and the second terminals of all terminal resistors 6 are connected to the ground. Each of the terminal resistors 6 has a control terminal connected to an output end of the comparator 5.

In this preferred embodiment, the polysilicon resistor 41 of the reference resistor 4 is with the same resistance value as that of the polysilicon resistor 61 of each terminal resistor 6. Moreover, the NMOS transistor 42 of the reference resistor 4 has the same W/L ratio as that of the NMOS transistor 62 of each terminal resistor 6. The external resistor 3 is connected to the second current source of the current mirror 2. The current I1 provided by the first current source is with the same magnitude with that of the current I2 provided by the second current source, thus a voltage V1 is present at the positive input end of the comparator 5 and a voltage V2 is present at the negative input end of the comparator 5.

When the resistance of the reference resistor 4 is larger than the resistance of the external resistor 3, V1 is larger than V2. As this result, the output end voltage VG of the comparator 5, the feedback voltage, increases, and the equivalent resistance of the NMOS transistor 42 decreases accordingly. Therefore, the resistance of the reference resistor 4 and the voltage V1 decrease until V1 is equal to V2. On the contrary, when the resistance of the reference resistor 4 is smaller than the resistance of the external resistor 3, V1 is smaller than V2, whereby leading to that the output voltage VG of the comparator 5 decreases and the equivalent resistance of the NMOS transistor 42 increases. Therefore, the resistance of the reference resistor 4 and the voltage V1 increase until V1=V2.

Because the current mirror 2 provides two substantially identical current sources I1 and I2 and the voltage V1 is kept equal to the voltage V2, the resistance of the reference resistor 4 will be equal to the resistance of the external resistor 3. Moreover, the control terminal of each terminal resistor 6 is connected to the output end of the comparator 5, thus the resistance of the reference resistor 4 will be equal to the resistance of each terminal resistor 6. It should be noted that the NMOS transistor 42 and the NMOS transistor 62 are operated in the linear region. That is why the terminal resistor 6 can be regarded as a linear resistor.

Moreover, the resistance of each terminal resistor 6 can be set to be proportional to the resistance of the reference resistor 4. For example, the resistance of the polysilicon resistor 41 can be n times of the resistance of the polysilicon resistor 61, or the W/L ratio of the NMOS transistor 62 can be n times of that of the NMOS transistor 42 is viable for this purpose. Alternatively, the NMOS transistor 62 can be designed to have n NMOS transistors 42, with the same W/L ratio, connected with each other in series. As this result, the resistance of the reference resistor 4 is n times of the resistance of the termination resistor 6, and the resistance of the external resistor 3 is also n times of the resistance of the termination resistor 6. Thus, the steady state current flowing through the external resistor 3 and the reference resistor 4 can be reduced to minimize the total power consumption.

Figure 5:
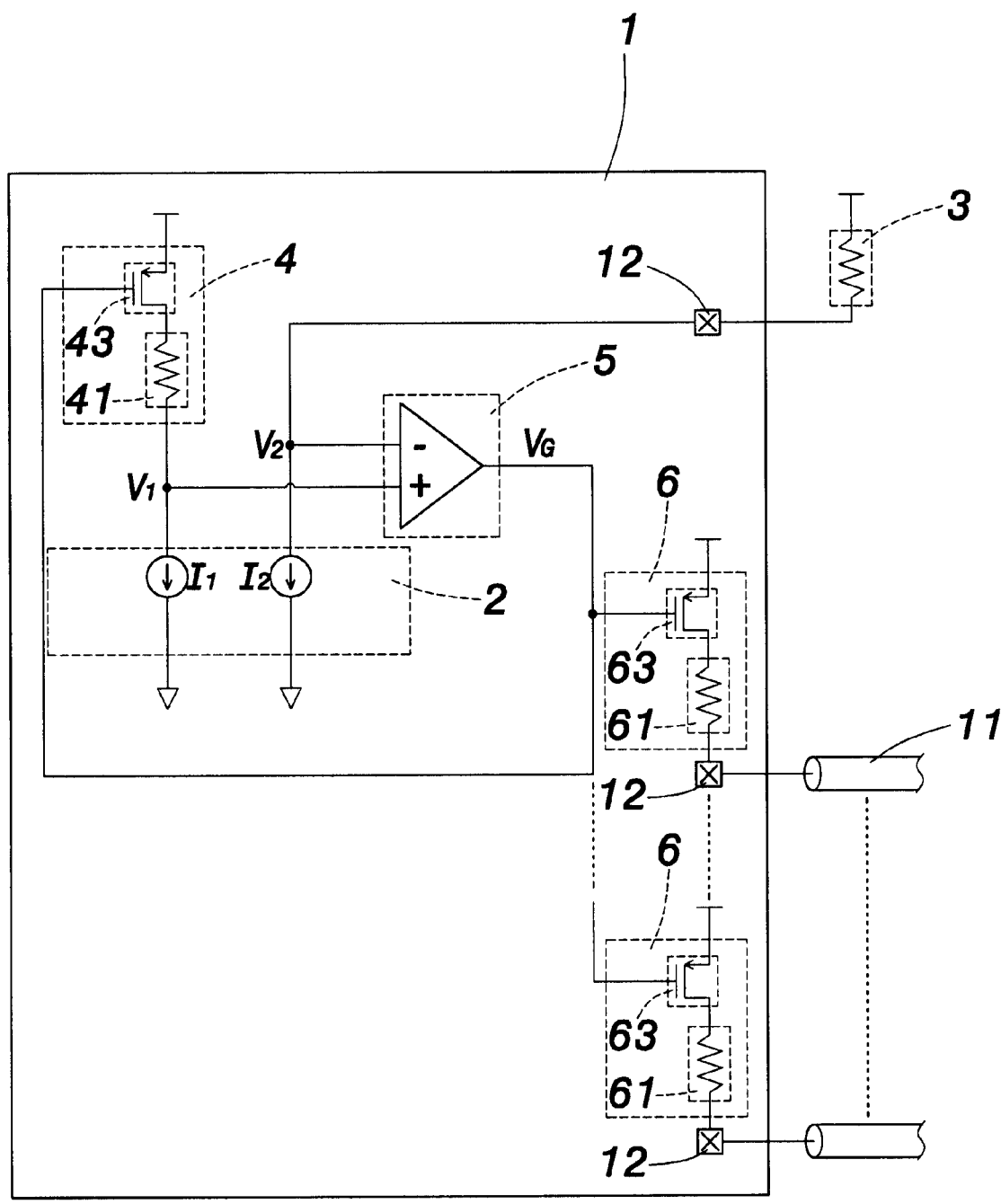
FIG. 5 shows the circuit diagram of the second embodiment according to the present invention.

FIG. 5 shows the circuit diagram of another embodiment according to the present invention. This self-compensation circuit provides a terminal resistor with the voltage level pull-up function. The self-compensation circuit according to the present invention is built in a chip 1 and is for compensating internal resistors within the chip 1 with respect to the external resistors 3. The self-compensation circuit according to the present invention includes a current mirror 2, a reference resistor 4, a comparator 5 and a plurality of terminal resistors 6.

The reference resistor 4 is composed of a polysilicon resistor 41 and a transistor 43 connected in series with the polysilicon resistor 41. In this embodiment, the transistor 43 is a PMOS transistor and one end of the polysilicon resistor 41 is connected to the drain of the PMOS transistor 43. Therefore, the other end of the polysilicon resistor 41 is a first terminal of the reference resistor 4 and the source of the PMOS transistor 43 is a second terminal of the reference resistor 4. Moreover, the reference resistor 4 has a control terminal connected to the gate of the PMOS transistor 43. Each of the terminal resistors 6 is also composed of a polysilicon resistor 61 and a PMOS transistor 63 connected in series with the polysilicon resistor 61. The terminal resistor 6 has a first terminal connected to a transmission line 11 through input/output ends 12 of the chip 1 and a second terminal connected to the power.

In this preferred embodiment of the present invention, the current mirror 2 has a first current source for providing current I1 and a second current source for providing current I2. The first terminal of the reference resistor 4 is connected to the first current source and the second terminal of the reference resistor 4 is connected to the power. The comparator 5 has a positive input end connected to the first current source and a negative input end connected to the second current source. The first terminals of all terminal resistors 6 are connected to the transmission line 11 through the input/output ends 12 of the chip 1, and the second terminals of all terminal resistors 6 are connected to the power. Each terminal resistor 6 has a control terminal connected to an output end of the comparator 5.

In this preferred embodiment, the polysilicon resistor 41 of the reference resistor 4 is with the same resistance value as that of the polysilicon resistor 61 of each terminal resistor 6. Moreover, the PMOS transistor 43 of the reference resistor 4 is with the same W/L ratio as that of the PMOS transistor 63 of each terminal resistor 6. The external resistor 3 is connected to the second current source of the current mirror 2. The current I1 provided by the first current source is with the same magnitude with that of the current I2 provided by the second current source. Moreover, a voltage V1 is present at the positive input end of the comparator 5 and a voltage V2 is present at the negative input end of the comparator 5.

When the resistance of the reference resistor 4 is larger than the resistance of the external resistor 3, V1 is larger than V2. Consequently, the output end voltage VG of the comparator 5 increases which leads to that the equivalent resistance of the PMOS transistor 43 decreases. Therefore, the resistance of the reference resistor 4 decreases and the voltage V1 increases until V1 is equal to V2. On the contrary, when the resistance of the reference resistor 4 is smaller than the resistance of the external resistor 3, V1 is smaller than V2. As this result, the output end voltage VG of the comparator 5 decreases and the equivalent resistance of the PMOS transistor 43 increases. Therefore, the resistance of the reference resistor 4 increases and the voltage V1 decreases until V1 is equal to V2.

The current mirror 2 provides two substantially identical current source I1 and I2. And because the voltage V1 is equal to the voltage V2, the resistance of the reference resistor 4 is kept equal to the resistance of the external resistor 3. Moreover, the control terminal of each terminal resistor 6 is connected to the output end of the comparator 5, and the resistance of the reference resistor 4 is kept equal to the resistance of each terminal resistor 6. It should be noted that the PMOS transistor 43 and the PMOS transistor 63 are operated in the linear region. Therefore, the terminal resistor 6 can be regarded as a linear resistor.

Moreover, the resistance of each terminal resistor 6 can be set to be proportional to the resistance of the reference resistor 4. For example, if the resistance of the polysilicon resistor 41 is designed to be n times of the resistance of the polysilicon resistor 61, or the W/L ratio of the PMOS transistor 63 is designed to be n times of that of the PMOS transistor 43, therefore, both of which can be viable for accomplishing the fact that the resistance of each terminal resistor 6 is proportional to that of the reference resistor 4. Alternatively, the PMOS transistor 63 can be designed to have n NMOS transistors 42, with the same W/L ratio, connected with each other in series. In this way, the resistance of the reference resistor 4 is n times of the resistance of the terminal resistor 6, and the resistance of the external resistor 3 is also n times of the resistance of the terminal resistor 6. The steady state current flowing through the external resistor 3 and the reference resistor 4 can be reduced to minimize the power consumption.

According to Ohm's law, the resistance of the external resistor 3 is equal or proportional to the resistance of the terminal resistor 6 as long as V1=V2 and I1=I2. In other words, the resistance of the NMOS transistor 62 or the resistance of the PMOS transistor 63 is adjusted by the feedback voltage VG output by the comparator 5 accordingly. As this result, the terminal resistor 6 can be automatically compensated and operated in the linear region, thus the resistance of the terminal resistor 6 can be achieved finally.

In the above description, the resistance of the terminal resistor 6 further can be adjusted by the feedback voltage VG outputted from the output terminal of the comparator 5 in an analog manner and proportional to the resistance of the external resistor 3. Of course the digital manner also can be applied to the present invention for the same purpose. For example, if each reference resistor 4 and terminal resistor 6 is composed of a plurality of MOS transistors connected in parallel connection and the comparator 5 has a plurality of output terminals, each of whom is connected to one MOS transistor of the reference resistor 4 and the terminal resistor 6, the aforementioned function can be obtained. While connecting the external resistor 3, the number of output terminals of the comparator 5 can be controlled by the comparator 5 itself for turning on MOS transistors of the reference resistor 4 until the voltage V1 is equal to V2. The comparator 5 controls the number of output terminals connected to the reference resistor 4 such that the resistance of the reference resistor 4 is kept equal or proportional to the resistance of the external resistor 3. The number of turned-on MOS transistors in the reference resistor 4 is equal to the number of turned-on MOS transistors in the terminal resistor 6. Therefore, the resistance of the terminal resistor 6 can also be controlled by the comparator 5.

To sum up, the self-compensation circuit for terminal resistance according to the present invention has following advantages:

(1) Self-compensation feature;
(2) Linear terminal resistor; and
(3) Less external resistors.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A self-compensation circuit for terminal resistors with reference to an external resistor, the self-compensation circuit comprising:
    a current mirror providing a first current and a second current, the second current flowing through the external resistor to form a second voltage;
    a reference resistor being passed by the first current to form a first voltage and having a first control terminal to control the resistance of the reference resistor;
    a comparator comparing the difference between the first voltage and the second voltage, having a feedback voltage on an output end, and feeding the feedback voltage back to the first control terminal until the first voltage and the second voltage are equal; and
    a plurality of terminal resistors, each of the terminal resistors having a second control terminal connected to the output end of the comparator such that the resistance of each terminal resistor is proportional to the resistance of the external resistor.

2. The self-compensation circuit as in claim 1, wherein the reference resistor comprises a polysilicon resistor and a transistor connected in series with the polysilicon resistor, and the first control terminal is the gate of the transistor.

3. The self-compensation circuit as in claim 2, wherein the transistor is a NMOS transistor operated in the linear region.

4. The self-compensation circuit as in claim 2, wherein the transistor is a PMOS transistor operated in the linear region.

5. The self-compensation circuit as in claim 1, wherein each terminal resistor comprises a polysilicon resistor and a transistor connected in series with the polysilicon resistor, and the second control terminal is the gate of the transistor.

6. The self-compensation circuit as in claim 5, wherein the transistor is a NMOS transistor operated in the linear region.

7. The self-compensation circuit as in claim 5, wherein the transistor is a PMOS transistor operated in the linear region.

8. The self-compensation circuit as in claim 1, wherein each terminal resistor is with one end connected between a power source and a transmission line.

9. A self-compensation circuit for terminal resistors comprising:
    a current mirror comprising a first current source for providing a first current and a second current source for providing a second current;
    a reference resistor having a first terminal, a second terminal and a first control terminal, the first terminal connected to the first current source such that the first current flows through the reference resistor to form a first voltage, the second terminal being connected to a voltage source;
    an external resistor connected between the second current source and the power source for being passed by the second current to form a second voltage,
    a comparator having a positive input connected to the first voltage, a negative input connected to the second voltage and an output end for generating a feedback voltage, the comparator generating the feedback voltage to the first control terminal by comparing the first voltage and the second voltage until the first voltage and the second voltage are equal; and a plurality of terminal resistors, each of the terminal resistors having a second control terminal connected to the output end of the comparator such that the resistance of each terminal resistor is proportional to the resistance of the external resistor.

10. The self-compensation circuit as in claim 9, wherein the voltage source is a ground voltage.

11. The self-compensation circuit as in claim 9, wherein the voltage source is a power source.

12. The self-compensation circuit as in claim 9, wherein the reference resistor comprises a polysilicon resistor and a transistor connected in series with the polysilicon resistor, and the first control terminal is the gate of the transistor.

13. The self-compensation circuit as in claim 12, wherein the transistor is an NMOS transistor operated in the linear region.

14. The self-compensation circuit as in claim 12, wherein the transistor is a PMOS transistor operated in the linear region.

15. The self-compensation circuit as in claim 9, wherein each terminal resistor comprises a polysilicon resistor and a transistor connected in series with the polysilicon resistor, and the second control terminal is the gate of the transistor.

16. The self-compensation circuit as in claim 15, wherein the transistor is an NMOS transistor operated in the linear region.

17. The self-compensation circuit as in claim 15, wherein the transistor is a PMOS transistor operated in the linear region.

18. The self-compensation circuit as in claim 9, wherein each terminal resistor is with one end connected between the power source and a transmission line.

19. A self-compensation circuit for terminal resistors with reference to an external resistor, the self-compensation circuit comprising:

a current mirror providing a first current and a second current, the second current flowing through the external resistor to form a second voltage;

a reference resistor being passed by the first current to form a first voltage, the reference resistor having a first set of control terminals to control the resistance of the reference resistor;

a comparator comparing the difference between the first voltage and the second voltage and generating a control signal to the first set of control terminals until the first voltage is equal to the second voltage; and a plurality of terminal resistors, each of the terminal resistors having a second set of control terminals connected to the output end of the comparator such that the resistance of each terminal resistor is proportional to the resistance of the external resistor.

20. The self-compensation circuit as in claim 19, wherein the reference resistor comprises a polysilicon resistor serially connected to a plurality of parallel transistors, and the first set of control terminals are the gates of the parallel transistors.

21. The self-compensation circuit as in claim 20, wherein the transistors are a plurality of NMOS transistors.

22. The self-compensation circuit as in claim 20, wherein the transistors are a plurality of PMOS transistors.

23. The self-compensation circuit as in claim 19, wherein the terminal resistor comprises a polysilicon resistor serially connected to a plurality of parallel transistors, and the second set of control terminals are the gates of the parallel transistors.

24. The self-compensation circuit as in claim 23, wherein the transistors are a plurality of NMOS transistors.

25. The self-compensation circuit as in claim 23, wherein the transistors are a plurality of PMOS transistors.

26. The self-compensation circuit as in claim 19, wherein each terminal resistor is with one end connected between a power source and a transmission line.

* * * * *